(12) United States Patent
Komeiji et al.

(10) Patent No.: US 12,340,807 B2
(45) Date of Patent: *Jun. 24, 2025

(54) SPEECH RECOGNITION APPARATUS, CONTROL METHOD, AND NON-TRANSITORY STORAGE MEDIUM

(71) Applicant: NEC Corporation, Tokyo (JP)

(72) Inventors: Shuji Komeiji, Tokyo (JP); Hitoshi Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 275 days.

This patent is subject to a terminal disclaimer.

(21) Appl. No.: 17/908,292

(22) PCT Filed: Mar. 9, 2020

(86) PCT No.: PCT/JP2020/009979
§ 371 (c)(1),
(2) Date: Aug. 31, 2022

(87) PCT Pub. No.: WO2021/181451
PCT Pub. Date: Sep. 16, 2021

(65) Prior Publication Data
US 2023/0109867 A1    Apr. 13, 2023

(51) Int. Cl.
*G10L 15/26* (2006.01)
*G06F 40/166* (2020.01)

(52) U.S. Cl.
CPC ............ *G10L 15/26* (2013.01); *G06F 40/166* (2020.01)

(58) Field of Classification Search
CPC ............................... G10L 15/26; G06F 40/166
USPC ............... 704/231, 246, 248, 249, 251, 254
See application file for complete search history.

(56) References Cited

U.S. PATENT DOCUMENTS 8,041,565 B1 * 10/2011 Bhardwaj ............... G10L 15/28
704/235

FOREIGN PATENT DOCUMENTS

| JP | 2002-341891 A | 11/2002 |
|----|---------------|---------|
| JP | 2008-116744 A | 5/2008 |
| JP | 2012-181307 A | 9/2012 |
| JP | 2013-101204 A | 5/2013 |
| JP | 2014-178959 A | 9/2014 |
| JP | 2017-015847 A | 1/2017 |

(Continued)

OTHER PUBLICATIONS

International Search Report for PCT Application No. PCT/JP2020/009979, mailed on Jun. 9, 2020.

(Continued)

*Primary Examiner* — George C Monikang
(74) *Attorney, Agent, or Firm* — Sughrue Mion, PLLC (57) ABSTRACT

A speech recognition apparatus (2000) acquires source data (10) representing an audio signal including an utterance. The speech recognition apparatus (2000) converts the source data (10) into a text string (30). The speech recognition apparatus (2000) generates a concatenated text (40) representing a content of an utterance by concatenating a text (32) included in the text string (30). Herein, texts (32) adjacent to each other in the text string (30) are such that parts of associated audio signals overlap each other on a time axis. At a time of concatenating texts (32) adjacent to each other, the speech recognition apparatus (2000) eliminates a trailing portion of a preceding text (32) and a leading portion of a succeeding text (32).

11 Claims, 5 Drawing Sheets

(56) References Cited

FOREIGN PATENT DOCUMENTS

JP            6511189 B1    5/2019
KR    10-2014-0076816 A    6/2014

OTHER PUBLICATIONS

JP Office Action for JP Application No. 2022-506994, mailed on Aug. 29, 2023 with English Translation.
Kozo Okuda et al., "Speaking Rate Compensation and Acoustic Model Creation Using Frame Period and Length Adaptation Based on Likelihood Criterion", The Institute of Electronics, Information and Communication Engineers. The IEICE Transactions, vol. J86-D-II, No. 2, Feb. 2003, pp. 204-211.
JP Office Action for JP Application No. 2022-506994, mailed on Dec. 26, 2023 with English Translation.

* cited by examiner

SPEECH RECOGNITION APPARATUS, CONTROL METHOD, AND NON-TRANSITORY STORAGE MEDIUM

This application is a National Stage Entry of PCT/JP2020/009979 filed on Mar. 9, 2020, the contents of all of which are incorporated herein by reference, in their entirety.

TECHNICAL FIELD

The present invention relates to speech recognition.

BACKGROUND ART

A speech recognition technique has been developed. By speech recognition, for example, an audio signal including an utterance of a person is converted into a text representing a content of the utterance.

Patent Document 1 discloses a technique for generating a word network from an audio signal by speech recognition. Herein, in Patent Document 1, an audio signal is divided into a plurality of sections, and speech recognition is performed with respect to an audio signal in each section. Further, parts of adjacent sections overlap each other on a time axis. Furthermore, in a word network corresponding to an overlapping portion of adjacent sections, a word that is detected from both of the sections, and whose ratio of time overlapping in both of the sections is large is adopted.

RELATED DOCUMENT

Patent Document

Patent Document 1: Japanese Patent Application Publication No. 2013-101204

SUMMARY OF THE INVENTION

Technical Problem

In Patent Document 1, a word included in a word network corresponding to an overlapping portion of adjacent sections is selected from among words detected from both of the sections. However, it is not always a case that, as a recognition result, a correct word is detected from both of the sections, and a correct word may be detected from only one of the sections. In this way, in a case where a correct word is detected from only one of overlapping sections, an error may occur in a recognition result by the method in Patent Document 1.

The present invention has been made in view of the above-described problem, and one of objects of the present invention is to provide a technique for improving accuracy of speech recognition.

Solution to Problem

A speech recognition apparatus according to the present invention includes a conversion unit that converts a source audio signal including an utterance into a text string, and a concatenating unit that generates a concatenated text representing a content of the utterance by concatenating texts adjacent to each other in the text string.

Parts of audio signals corresponding to texts adjacent to each other in the text string overlap each other on a time axis.

At a time of concatenating a preceding text and a succeeding text adjacent to each other in the text string, the concatenating unit eliminates, from a preceding text, a part including a trailing portion thereof, and eliminates, from a succeeding text, a part including a leading portion thereof.

A control method according to the present invention is executed by a computer. The control method includes a conversion step of converting a source audio signal including an utterance into a text string, and a concatenating step of generating a concatenated text representing a content of the utterance by concatenating texts adjacent to each other in the text string.

Parts of audio signals corresponding to texts adjacent to each other in the text string overlap each other on a time axis.

In the concatenating step, the method includes, at a time of concatenating a preceding text and a succeeding text adjacent to each other in the text string, eliminating, from a preceding text, a part including a trailing portion thereof, and eliminating, from a succeeding text, a part including a leading portion thereof.

A program according to the present invention causes a computer to execute the control method according to the present invention.

Advantageous Effects of Invention

The present invention provides a technique for improving accuracy of speech recognition.

DESCRIPTION OF EMBODIMENTS

Hereinafter, an example embodiment according to the present invention is described with reference to the drawings. Note that, in all drawings, a similar constituent element is designated by a similar reference sign, and description thereof is omitted as necessary. Further, in each block diagram, each block represents a configuration of a functional unit instead of a configuration of a hardware unit, unless otherwise specifically described. In the following description, a predetermined value (such as a threshold value) of each kind is stored in advance in a storage apparatus accessible from a functional configuration unit using the value, unless otherwise specifically described.

Example Embodiment 1

<Overview>

Figure 1:
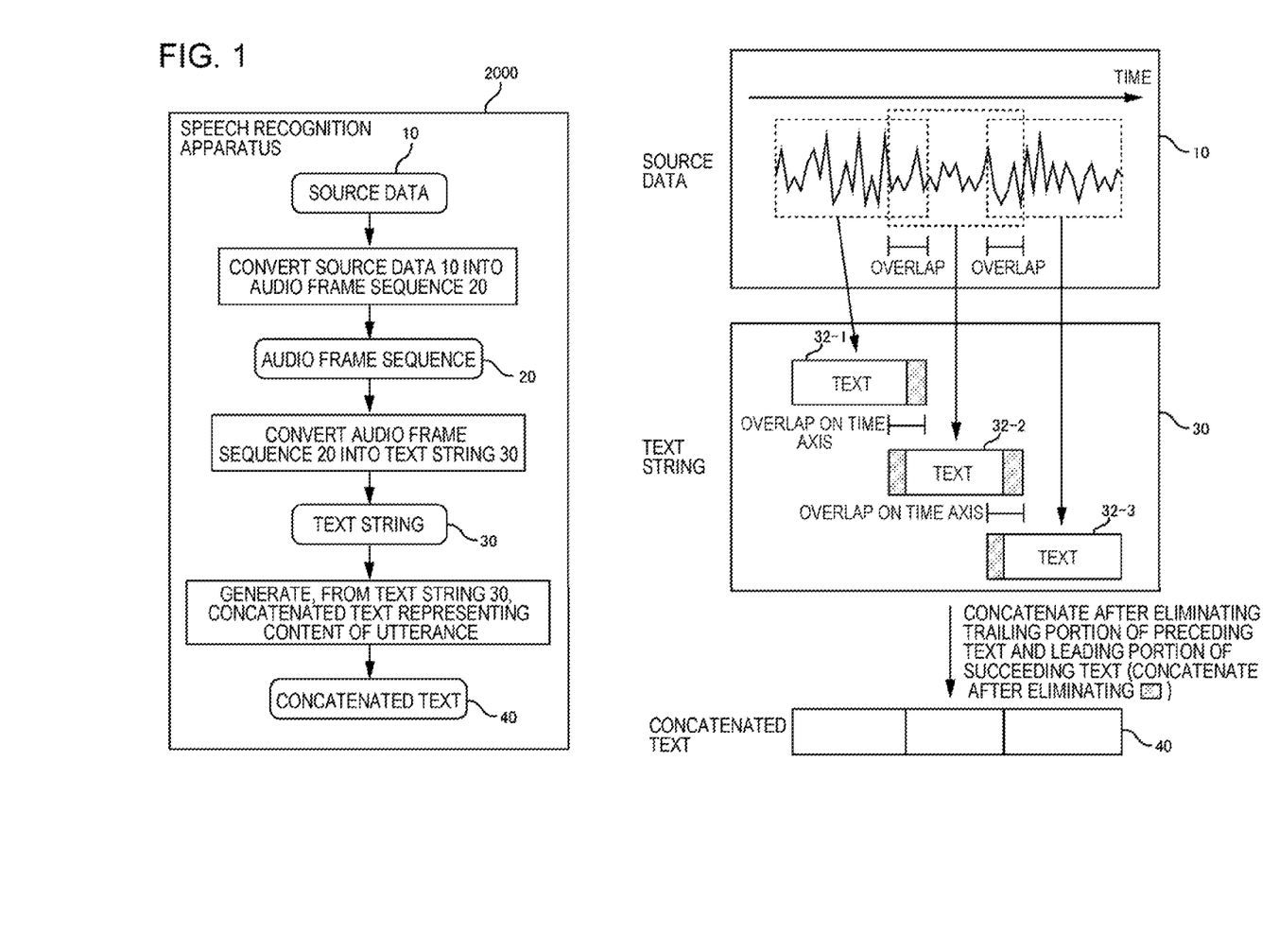
FIG. 1 is a diagram conceptually illustrating an operation of a speech recognition apparatus 2000 according to an example embodiment 1.

FIG. 1 is a diagram conceptually illustrating an operation of a speech recognition apparatus 2000 according to an example embodiment 1. Herein, an operation of the speech recognition apparatus 2000 described with reference to FIG.

1 is an example for easily understanding the speech recognition apparatus 2000, and does not limit an operation of the speech recognition apparatus 2000. Details and a variation of an operation of the speech recognition apparatus 2000 will be described later.

The speech recognition apparatus 2000 is used for converting an audio representing an utterance into a text representing a content of the utterance. For this reason, the speech recognition apparatus 2000 is operated as follows.

The speech recognition apparatus 2000 acquires source data 10. The source data 10 are audio data in which an utterance of a person is recorded, and are, for example, recorded data and the like of a conversation or a speech. Audio data are, for example, vector data and the like representing a waveform of an audio signal. Hereinafter, an audio signal represented by the source data 10 is also referred to as a source audio signal.

The speech recognition apparatus 2000 generates an audio frame sequence 20 from the source data 10. The audio frame sequence 20 is a time-series data of a plurality of audio frames to be acquired from the source data 10. A audio frame is, for example, audio data representing an audio signal in a part of a time section among a source audio signal, or a audio feature value to be acquired from the audio data. Herein, parts of audio signals corresponding to audio frames adjacent to each other in the audio frame sequence 20 overlap each other on a time axis.

The speech recognition apparatus 2000 converts the audio frame sequence 20 into a string (text string 30) of texts 32 by converting each audio frame included in the audio frame sequence 20 into the text 32. Further, the speech recognition apparatus 2000 generates a text (a concatenated text 40) representing a content of an utterance represented by the source data 10 by concatenating the texts 32 adjacent to each other in the text string 30.

Herein, as described above, parts of audio signals represented by audio frames adjacent to each other in the audio frame sequence 20 overlap each other on a time axis. Therefore, an overlapping portion is also present in the texts 32 adjacent to each other in the text string 30. In other words, an overlapping time section is present in an audio signal corresponding to a certain text 32, and an audio signal corresponding to a text 32 located next to the certain text 32. Therefore, at a time of concatenating texts 32 adjacent to each other, it is necessary to eliminate an overlap as described above.

Herein, at a time of performing conversion from an audio signal into a text, conversion accuracy is likely to be lowered regarding a leading portion and a trailing portion of the audio signal. In view of the above, at a time of concatenating texts 32 connecting to each other, the speech recognition apparatus 2000 performs concatenation after eliminating a part of a trailing portion of a text 32 located at a preceding position, and eliminating a part of a leading portion of a text 32 located at a succeeding position. For example, in FIG. 1, at a time of concatenating a text 32-1 and a text 32-2, a trailing portion of the text 32-1, and a leading portion of the text 32-2 are eliminated. Likewise, at a time of concatenating the text 32-2 and a text 32-3, a trailing portion of the text 32-2, and a trailing portion of the text 32-3 are eliminated.

For example, it is assumed that source data 10 representing a content of an utterance being "tokuni kyouha tenkiga ii" are input to the speech recognition apparatus 2000. Further, it is assumed that an audio frame-1 and an audio frame-2 are generated from the source data 10, and these are respectively converted into a text 32-1 "tokuni kyouha heiki", and a text 32-2 "syouha tenkiga ii".

In this case, for example, the speech recognition apparatus 2000 acquires a text "tokuni kyouha" by eliminating a partial text "heiki" from a trailing portion of the text 32-1. Further, the speech recognition apparatus 2000 acquires a text "tenkiga ii" by eliminating a partial text "syouha" from a leading portion of the text 32-2. Furthermore, the speech recognition apparatus 2000 generates a concatenated text 40 "tokuni kyouha tenkiga ii" by concatenating "tokuni kyouha" and "tenkiga ii".

<One Example of Advantageous Effect>

At a time of extracting a plurality of audio signals from an audio signal (source audio signal) for speech recognition target, and converting the extracted audio signals into texts, conversion accuracy is likely to be lowered regarding a leading portion and a trailing portion of the extracted audio signals, as compared with other portions. In view of the above, at a time of generating an audio frame sequence 20 from a source audio signal, the speech recognition apparatus 2000 extracts audio signals in such a way that parts of audio frames adjacent to each other overlap each other on a time axis. Further, at a time of generating a concatenated text 40 representing a content of an utterance by concatenating texts 32 acquired from each audio frame, concatenation of texts 32 adjacent to each other is performed after eliminating a part of a trailing portion of a text 32 located at a preceding position, and eliminating a part of a leading portion of a text 32 located at a succeeding position. Thus, in a text (concatenated text 40) representing a content of an utterance, which is acquired as a result of speech recognition, texts corresponding to a leading portion and a trailing portion of an audio signal in which conversion accuracy (specifically, accuracy of speech recognition) is likely to be lowered are not used. Therefore, speech recognition having high accuracy can be achieved.

Herein, the above-described Patent Document 1 also describes a method of concatenating recognition results of different sections. Specifically, in Patent Document 1, a word network is formed by selecting, regarding an overlapping portion of adjacent sections, a word whose overlapping ratio on a time axis is equal to or more than a predetermined value, from among words detected from both of the sections.

However, it is not always a case that a correct word is detected from both of overlapping sections, and a correct word may be detected from only one of the sections. In this way, in a case where a correct word is detected from only one of the overlapping sections, a correct word is not included in a word network, and an error may occur in a recognition result.

In this regard, in speech recognition by the speech recognition apparatus 2000, since a problem that "an error may occur in a recognition result because a correct word is detected from only one of the overlapping sections" does not occur, accuracy of speech recognition is improved.

Hereinafter, the speech recognition apparatus 2000 is described in more detail.

<Example of Functional Configuration>

Figure 2:
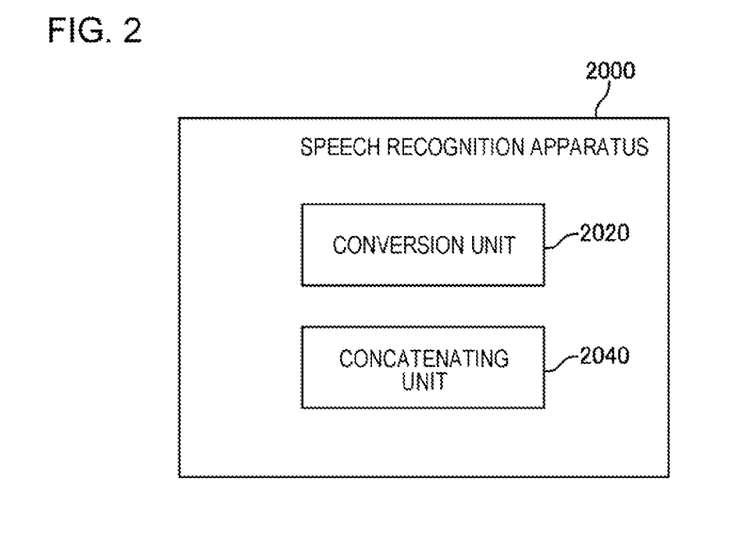
FIG. 2 is a block diagram illustrating a functional configuration of the speech recognition apparatus 2000.

FIG. 2 is a block diagram illustrating a functional configuration of the speech recognition apparatus 2000. The speech recognition apparatus 2000 includes a conversion unit 2020 and a concatenating unit 2040. The conversion unit 2020 converts source data 10 into an audio frame sequence 20. Further, the conversion unit 2020 converts the audio frame sequence 20 into a text string 30 by converting each audio frame included in the audio frame sequence 20 into a text 32. The concatenating unit 2040 generates a concatenated text 40 by concatenating texts 32 adjacent to each other in the text string 30. Herein, at a time of concatenating texts 32 adjacent to each other, the concatenating unit 2040 performs concatenation after eliminating, from a text 32 located at a preceding position, a part of a trailing portion thereof, and eliminating, from a text 32 located at a succeeding position, a part of a leading portion thereof.

<Example of Hardware Configuration>

Each functional configuration unit of the speech recognition apparatus 2000 may be achieved by hardware (example: a hard-wired electronic circuit, and the like) achieving each functional configuration unit, or may be achieved by combination of hardware and software (example: combination of an electronic circuit and a program for controlling the electronic circuit, and the like). Hereinafter, a case where each functional configuration unit of the speech recognition apparatus 2000 is achieved by combination of hardware and software is further described.

Figure 3:
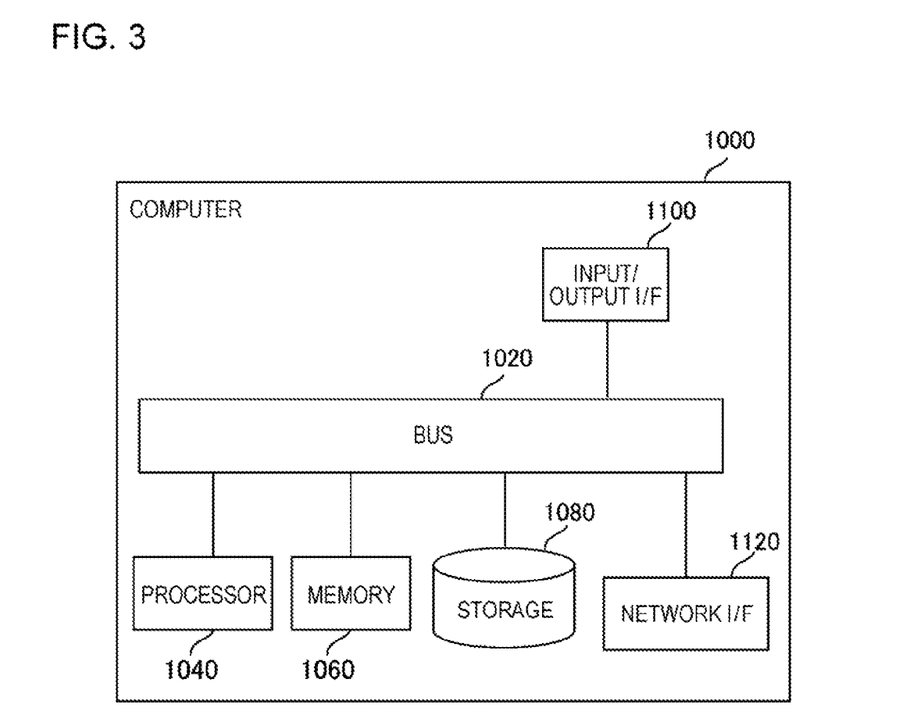
FIG. 3 is a diagram illustrating a computer 1000 for achieving the speech recognition apparatus 2000.

FIG. 3 is a diagram illustrating a computer 1000 for achieving the speech recognition apparatus 2000. The computer 1000 is any computer. For example, the computer 1000 is a stationary computer such as a personal computer (PC) or a server machine. In another example, the computer 1000 is a portable computer such as a smartphone or a tablet terminal.

The computer 1000 may be a dedicated computer designed for achieving the speech recognition apparatus 2000, or may be a general-purpose computer. In the latter case, for example, the computer 1000 achieves each function of the speech recognition apparatus 2000 by installing a predetermined application in the computer 1000. The above-described application is configured of a program for achieving a functional configuration unit of the speech recognition apparatus 2000.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection.

The processor 1040 is various processors such as a central processing unit (CPU), a graphics processing unit (GPU), and a field-programmable gate array (FPGA). The memory 1060 is a main storage apparatus to be achieved by using a random access memory (RAM) or the like. The storage device 1080 is an auxiliary storage apparatus to be achieved by using a hard disk, a solid state drive (SSD), a memory card, a read only memory (ROM), or the like.

The input/output interface 1100 is an interface for connecting the computer 1000 to an input/output device. For example, the input/output interface 1100 is connected to an input apparatus such as a keyboard, and an output apparatus such as a display apparatus.

The network interface 1120 is an interface for connecting the computer 1000 to a communication network. The communication network is, for example, a local area network (LAN) or a wide area network (WAN).

The storage device 1080 stores a program (program achieving the above-described application) achieving each functional configuration unit of the speech recognition apparatus 2000. The processor 1040 achieves each functional configuration unit of the speech recognition apparatus 2000 by reading the program in the memory 1060 and executing the program.

Herein, the speech recognition apparatus 2000 may be achieved by one computer 1000, or may be achieved by a plurality of computers 1000. In the latter case, for example, the speech recognition apparatus 2000 is achieved as a distributed system including one or more computers 1000 achieving the conversion unit 2020, and one or more computers 1000 achieving the concatenating unit 2040.

<Flow of Processing>

Figure 4:
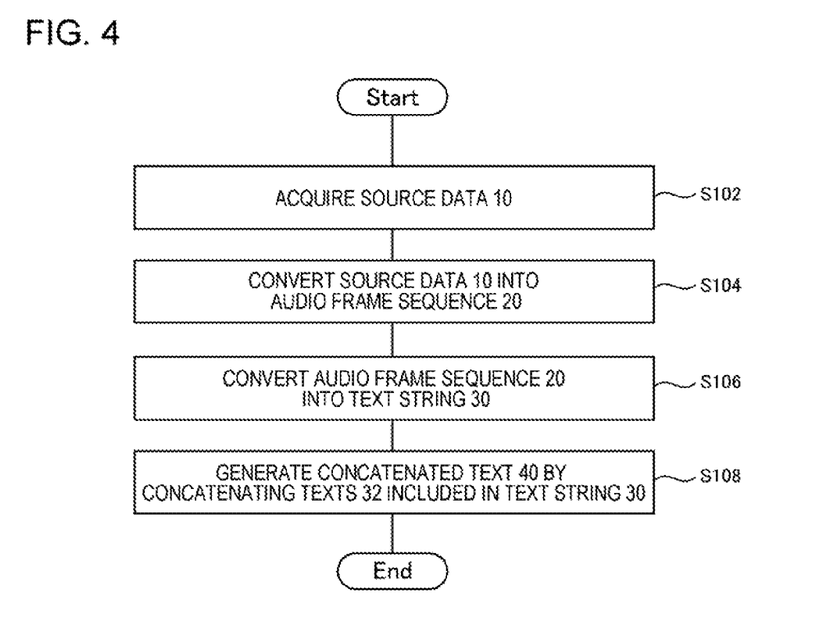
FIG. 4 is a flowchart illustrating a flow of processing to be performed by the speech recognition apparatus 2000 according to the example embodiment 1.

FIG. 4 is a flowchart illustrating a flow of processing to be performed by the speech recognition apparatus 2000 according to the example embodiment 1. The conversion unit 2020 acquires source data 10 (S102). The conversion unit 2020 converts the source data 10 into an audio frame sequence 20 (S104). The conversion unit 2020 converts the audio frame sequence 20 into a text string 30 (S106). The concatenating unit 2040 generates a concatenated text 40 by concatenating the text string 30 (S108).

<Acquisition of Source Data 10: S102>

The conversion unit 2020 acquires source data 10 (S102). A method of acquiring source data 10 by the conversion unit 2020 is optional. For example, the conversion unit 2020 acquires source data 10 by receiving the source data 10 to be transmitted from a user terminal being operated by a user. In addition to the above, for example, the conversion unit 2020 may acquire source data 10 stored in a storage apparatus accessible from the conversion unit 2020. In this case, for example, the speech recognition apparatus 2000 accepts, from a user terminal, specification of source data 10 (specification of a file name and the like) to be acquired. In addition to the above, for example, the conversion unit 2020 may acquire, as a piece of source data 10, each of one or more pieces of data stored in the above-described storage apparatus. Specifically, in this case, batch processing is performed for a plurality of pieces of source data 10 stored in advance in a storage apparatus.

<Conversion into Audio Frame Sequence 20: S104>

The conversion unit 2020 converts source data 10 into an audio frame sequence 20 (S104). Herein, parts of audio signals corresponding to audio frames adjacent to each other in the audio frame sequence 20 overlap on a time axis. For example, the conversion unit 2020 extracts an audio signal included in a time window in order, while moving the time window at a predetermined time width from a leading position of a source audio signal. Hereinafter, a length of a time window is referred to as a window width, and a length by which the time window is moved by one-time movement is referred to as a slide width.

In a case where an audio signal is handled as an audio frame, the conversion unit 2020 generates an audio frame sequence 20 by handling each extracted audio signal as an audio frame. On the other hand, in a case where an audio feature value is handled as an audio frame, the conversion unit 2020 converts each extracted audio signal into an audio feature value, and generates an audio frame sequence 20 by handling each acquired audio feature value as an audio frame. Note that, an audio frame corresponding to an audio signal located at an earlier position on a time axis is also located at an earlier position in an audio frame sequence 20.

Figure 5:
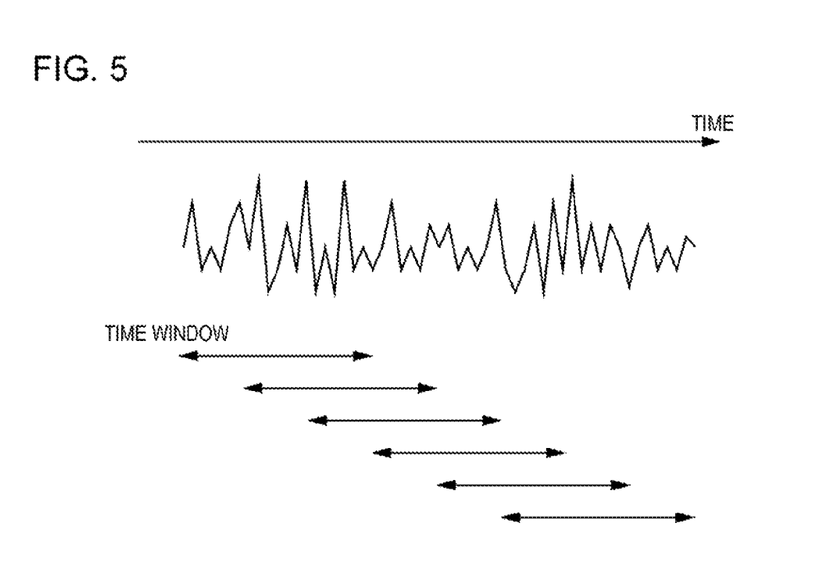
FIG. 5 is a diagram illustrating a case where three audio signals overlap.

Herein, a slide width is set to be smaller than a window width. Thus, at least two audio signals adjacent to each other overlap each other on a time axis among audio signals to be extracted from a source audio signal. Note that, the number of overlapping audio signals is not limited to two, and a slide width and a window width may be defined in such a way that three or more audio signals overlap. FIG. 5 is a diagram illustrating a case where three audio signals overlap.

A slide width and a window width may be fixedly set, or may not be fixedly set. For example, in the latter case, a slide width and a window width are defined according to various conditions. For example, information in which a condition, and a pair of "a slide width and a window width" associated with the condition are associated with each other is stored in advance in a storage apparatus. Hereinafter, the information is referred to as setting information. The conversion unit 2020 acquires information indicating a condition, and generates an audio frame sequence 20 by using a slide width and a window width associated with a condition indicated by the information.

Note that, setting information may indicate either one of a slide width and a window width. For example, in a case where only a slide width is indicated in setting information, the conversion unit 2020 uses a value indicated in the setting information regarding the slide width, and uses a value set as a default regarding a window width. In a case where only a window width is indicated in setting information, a similar is also applied.

Various conditions can be adopted as a condition indicated by setting information. For example, as a condition, identification information of a speaker is used. In this case, in setting information, a slide width and a window width are associated with identification information of a speaker. The conversion unit 2020 determines identification information of a speaker of an utterance represented by source data 10, and acquires setting information indicating the identification information.

There are various methods of acquiring identification information of a speaker by the conversion unit 2020. For example, the conversion unit 2020 acquires identification information of a speaker input by a user. In addition to the above, for example, the conversion unit 2020 may acquire identification information of a speaker determined by using source data 10. Specifically, the speech recognition apparatus 2000 converts a part of an audio signal represented by source data 10 into an audio feature value, and determines identification information of a speaker by using the audio feature value. In this case, information in which identification information of a speaker, and an audio feature value are associated with each other is stored in advance in a storage apparatus. Note that, an existing technique can be used as a technique for determining a speaker by using an audio feature value.

Note that, identification information of a group of speakers may be used, instead of identification information of a speaker. For example, the conversion unit 2020 acquires identification information of a group of speakers input by a user.

In addition to the above, for example, as a condition, a language of an utterance can be used. In this case, in setting information, a slide width and a window width are associated with identification information of a language. The conversion unit 2020 determines identification information of a language of an utterance represented by source data 10, and acquires setting information indicating the identification information. For example, in a case where source data 10 are speech data in which an English conversation is recorded, setting information indicating an English language is used.

There are various methods of acquiring identification information of a language by the conversion unit 2020. For example, the conversion unit 2020 acquires identification information of a language input by a user. In addition to the above, for example, the conversion unit 2020 may determine identification information of a language by using source data 10. Specifically, the speech recognition apparatus 2000 converts a part of an audio signal represented by source data 10 into an audio feature value, and determines identification information of a language by using the audio feature value. Note that, an existing technique can be used as a technique for determining a language by using an audio feature value.

In addition to the above, for example, as a condition, a task (kind of an utterance) can be used. In this case, in setting information, a slide width and a window width are associated with identification information of a task. The conversion unit 2020 determines identification information of a task associated with source data 10, and acquires setting information indicating the identification information. For example, as a task, an item such as a conference and a presentation can be adopted.

There are various methods of acquiring identification information of a task related to source data 10 by the conversion unit 2020. For example, the conversion unit 2020 acquires identification information of a task input by a user.

Note that, processing of determining a speaker, a language, or the like from an audio feature value may be performed by an apparatus other than the speech recognition apparatus 2000. In this case, the speech recognition apparatus 2000 acquires, from the other apparatus, identification information of a speaker or a language.

A method (method of generating setting information) of determining a slide width and a window width associated with the above-described various conditions is optional. For example, before an operation of the speech recognition apparatus 2000 is started, setting information is generated by using test data. Specifically, an operation of giving source data 10 meeting a specific condition to the speech recognition apparatus 2000 is performed, while changing a slide width and a window width in various ways. Further, setting information in which a slide width and a window width with which a concatenated text 40 is correctly acquired, and the above-described specific condition are associated with each other is generated, and stored in a storage apparatus.

A length (window width) of each audio signal to be extracted from one piece of source data 10 may not be fixed. For example, at a time of extracting an audio signal one by one from source data 10, the conversion unit 2020 determines a length of an audio signal according to an estimated speed (hereinafter, an estimated utterance speed) of an utterance represented by the audio signal that is about to be extracted from now on. Specifically, it is suitable to extend a length of an audio signal, as an estimated utterance speed increases in order to make the number of phonemes included in each extracted audio signal to be substantially equal.

For example, the conversion unit 2020 computes an index value (hereinafter, an utterance speed index value) representing an estimated utterance speed by analyzing an audio signal of a predetermined length from a start point of time of an audio signal that is about to be extracted from now on. Further, the conversion unit 2020 extracts an audio signal of a length according to the computed utterance speed index value, and generates an audio frame from the audio signal. Note that, as an utterance speed index value, the number of words, the number of moras, and the like included in each unit time can be used.

A correlation between an utterance speed index value and an audio signal is defined in advance. For example, a function in which a length of an audio signal is output in response to an input of an utterance speed index value is defined in advance. Any monotonous non-decreasing function can be used as the function. By using a monotonous non-decreasing function, a length of an audio signal increases, as an utterance speed increases. In this case, the conversion unit 2020 computes a length of an audio signal by inputting a computed utterance speed index value to the above-described function. Note that, a learned model may be used instead of a function.

In addition to the above, for example, a plurality of numerical value ranges may be defined regarding an utterance speed index value, and information in which each numerical value range, and a length of an audio signal are associated with each other may be prepared in advance. In this case, the conversion unit 2020 acquires a length of an audio signal associated with a numerical value range including a computed utterance speed index value.

An utterance speed index value may be computed by using an already extracted audio signal (e.g., an audio signal extracted immediately before (located at an immediately preceding position on a time axis)), instead of an audio signal that is about to be extracted from now on. In this case, for example, the conversion unit 2020 generates an audio frame from an audio signal, each time the audio signal is extracted, and converts the audio frame into a text string 30. The conversion unit 2020 computes an utterance speed index value by using a length of an audio signal, a length of a generated text string 30, and the like. Further, the conversion unit 2020 determines a length of an audio signal to be extracted next by using the computed utterance speed index value. According to the method, since an utterance speed index value is computed by using a text string 30 being inevitably generated in terms of an operation of the speech recognition apparatus 2000, processing can be performed efficiently.

<<Regarding Use of Audio Section Detection>>

Before converting source data 10 into an audio frame sequence 20, the conversion unit 2020 may perform audio section detection, and divide a source audio signal into one or more audio sections. In other words, the conversion unit 2020 may eliminate a silence section from a source audio signal. For example, one audio section is equivalent to an utterance representing one sentence. Therefore, by dividing a source audio signal into audio sections, it is possible to acquire, from the source audio signal, a plurality of audio sections, each of which is inferred to represent one sentence.

In this case, the conversion unit 2020 generates an audio frame sequence 20 for each audio section. Therefore, a text string 30 and a concatenated text 40 are also generated for each audio section. Thus, for example, a plurality of concatenated texts 40, each of which represents one sentence, are acquired from source data 10.

However, in audio section detection, one sentence may be divided into a plurality of audio sections. For example, there is a case where a geminate consonant may be erroneously recognized as a silence section.

In view of the above, for example, in a case where a silence section of a length equal to or less than a predetermined value is detected, the conversion unit 2020 may handle audio sections preceding and succeeding the silence section as one audio section. Specifically, sections from a leading end of a audio section preceding the silence section until a terminal end of a audio section succeeding the silence section are integrated into one audio section. (In other words, a short silence section as described above is not handled as a silence section).

After integrating two audio sections into one audio section as described above, the conversion unit 2020 may generate an audio frame sequence 20 regarding the one audio section, or may generate an audio frame sequence 20 individually from two audio sections before integration. In the latter case, the conversion unit 2020 concatenates individually generated two audio frame sequences 20 into one string. At this occasion, for example, it is suitable for the conversion unit 2020 to generate an audio frame also regarding a portion including the above-described silence section, and generate one audio frame sequence 20 by concatenating in the order of 1) an audio frame sequence 20 generated regarding a preceding audio section, 2) an audio frame generated regarding a portion including a silence section, and 3) an audio frame sequence 20 generated regarding a succeeding audio section. Thus, speech recognition having high accuracy is enabled also for sections preceding and succeeding a silence section.

<Conversion into Text String 30: S104>

The conversion unit 2020 converts an audio frame sequence 20 into a text string 30 (S104). An existing technique can be used as a technique for converting an audio frame into a text. For example, the conversion unit 2020 includes a conversion model being learned in such a way as to convert an audio frame into a text string 30. The conversion unit 2020 inputs in order each audio frame included in an audio frame sequence 20 to a conversion model. Consequently, a text string 30 corresponding to the audio frame sequence 20 is acquired from the conversion model. Note that, an existing technique can be used as a technique for generating a model for converting an audio frame into a text.

<Generation of Concatenated Text 40: S106>

The concatenating unit 2040 generates a concatenated text 40 by concatenating a text 32 included in a text string 30 (S106). As described above, a part of each audio signal to be extracted from source data 10 overlaps a part of another audio signal adjacent to each audio signal on a time axis. In view of the above, at a time of concatenating texts 32 adjacent to each other, the concatenating unit 2040 prevents the texts 32 to be concatenated each other from overlapping on a time axis by eliminating, from a text 32 located at a preceding position, a part of a trailing portion thereof, and eliminating, from a text 32 located at a succeeding position, a part of a leading portion thereof. Hereinafter, regarding two texts 32 to be concatenated each other, a text 32 located at a preceding position is referred to as a preceding text, and a text 32 located at a succeeding position is referred to as a succeeding text. Further, a text of an overlapping portion is referred to as an overlapping text.

In order to perform concatenation as described above, it is necessary to determine a portion to be eliminated, regarding each of a preceding text and a succeeding text. For this reason, for example, the concatenating unit 2040 performs the following processing.

First, the concatenating unit 2040 determines a range in which a preceding text and a succeeding text overlap each other on a time axis. For example, at a time of generating each text 32, the conversion unit 2020 records, for each character included in a text 32, a position (e.g., a relative point of time when it is assumed that a start position of a source audio signal is zero) of an audio signal corresponding to the character on a time axis. The concatenating unit 2040 can determine an overlapping range of a preceding text and a succeeding text by using information recorded as described above.

For example, it is assumed that a start point of time and an end point of time of an audio signal corresponding to a preceding text are respectively t1 and t2, and a start point of time and an end point of time of an audio signal corresponding to a succeeding text are respectively t3 and t4. In this case, the audio signal corresponding to the preceding text, and the audio signal corresponding to the succeeding text overlap each other in a time section from the point of time t3 to the point of time t2. Therefore, a portion of the preceding text corresponding to an audio signal from the point of time t3 to the point of time t2 is a text that overlaps the succeeding text. A similar is also applied to the succeeding text.

For example, the concatenating unit 2040 computes a midpoint (hereinafter, an overlapping center point of time) of a time section (hereinafter, an overlapping section) in which a preceding text and a succeeding text overlap. In the above-described example, (t2−t3)/2 becomes an overlapping center point of time. Further, the concatenating unit 2040 eliminates a portion later than the overlapping center point of time from the preceding text, and eliminates a portion earlier than the overlapping center point of time from the succeeding text. Thus, an overlap of the preceding text and the succeeding text is eliminated.

In addition to the above, for example, the concatenating unit 2040 detects one or more portions that do not match with each other by comparing a first overlapping text and a second overlapping text. Further, the concatenating unit 2040 determines to which one of a start point of time and an end point of time of an overlapping section, the detected unmatched portion is close. In a case where the unmatched portion is closer to the start point of time, the concatenating unit 2040 deletes a character corresponding to the unmatched portion (replaces into a text representing a blank) in the second overlapping text. On the other hand, in a case where the unmatched portion is closer to the end point of time, the concatenating unit 2040 deletes a character corresponding to the unmatched portion (replaces into a text representing a blank) in the first overlapping text. Thus, regarding a portion close to a start point of time, a content of a succeeding text is prioritized, and regarding a portion close to an end point of time, a content of a preceding text is prioritized.

In other words, at a time of concatenating texts 32 adjacent to each other, in a case where contents of a preceding text and a succeeding text do not match in an overlapping section, the concatenating unit 2040 adopts the content of either one of the texts. At this occasion, in a case where the unmatched portion is closer to the start point of time than the end point of time of the overlapping section, the concatenating unit 2040 adopts the content of the succeeding text, and in a case where the unmatched portion is closer to the end point of time than the start point of time, the concatenating unit 2040 adopts the content of the preceding text.

<Use Method of Concatenated Text 40>

A use method of a concatenated text 40 is optional. For example, the speech recognition apparatus 2000 outputs a generated concatenated text 40. An output destination of the concatenated text 40 is optional. For example, the speech recognition apparatus 2000 stores the concatenated text 40 in a storage apparatus, causes a display apparatus to display the concatenated text 40, or transmits the concatenated text 40 to any another apparatus (e.g., a transmission source of source data 10). Since the concatenated text 40 is a text representing a content of an utterance represented by source data 10, by browsing the concatenated text 40 output as described above, a user of the speech recognition apparatus 2000 can visually recognize a content of an utterance represented by the source data 10.

The speech recognition apparatus 2000 may output a concatenated text 40 after applying various pieces of processing to the concatenated text 40, instead of outputting the concatenated text 40 as it is. For example, in a case where the concatenated text 40 is a character string of hiragana or katakana, the speech recognition apparatus 2000 may apply kana-kanji conversion processing to the concatenated text 40. Thus, the concatenated text 40 is converted into a text including kanji. Note that, an existing technique can be used as a technique for converting a character string of hiragana or katakana into a text including kanji.

<Selection of Model According to Use Scene>

It is suitable that a conversion model for converting an audio frame into a text can be switched according to a use scene. For example, whereas in a conference of people in a field of computer engineering, technical terms in the field of computer engineering frequently appear, in a conference of people in a medical field, technical terms in the medical field frequently appear. In view of the above, for example, a learned model is prepared for each field. In addition to the above, for example, it is suitable to prepare a model for each language such as Japanese and English.

Various methods can be adopted as a method of selecting a set of models for each use scene (a field or a language). For example, in one speech recognition apparatus 2000, a model is configured to be switched according to a use scene. In this case, identification information of a use scene, and a learned model are stored in association with each other in advance in a storage apparatus accessible from the speech recognition apparatus 2000. The speech recognition apparatus 2000 provides a user with a screen for selecting a use scene. The speech recognition apparatus 2000 reads, from the storage apparatus, a learned model associated with a use scene selected by a user. The conversion unit 2020 and the concatenating unit 2040 use the read model. Thus, conversion from an audio frame into a text is performed by using a learned model suitable for a use scene selected by a user.

In addition to the above, for example, a plurality of speech recognition apparatuses 2000 may be prepared, and a different model may be set for each speech recognition apparatus 2000. In this case, a speech recognition apparatus 2000 associated with a use scene is used. For example, a front-end machine that accepts a request from a user is prepared, and the machine provides the above-described selection screen. When a user selects a use scene on the selection screen, conversion from an audio frame into a text is performed by using the speech recognition apparatus 2000 associated with the selected use scene.

A part or all of the above-described example embodiment may also be described as the following supplementary notes, but is not limited to the following.

1. A speech recognition apparatus including:
   a conversion unit that converts a source audio signal including in an utterance into a text string; and
   a concatenating unit that generates a concatenated text representing a content of the utterance by concatenating texts adjacent to each other in the text string, wherein
   parts of audio signals corresponding to texts adjacent to each other in the text string overlap each other on a time axis, and,
   at a time of concatenating a preceding text and a succeeding text adjacent to each other in the text string, the concatenating unit eliminates, from a preceding text, a part including a trailing portion of the preceding text, and eliminates, from a succeeding text, a part including a leading portion of the succeeding text.

2. The speech recognition apparatus according to supplementary note 1, wherein
   the concatenating unit
      determines a midpoint of a time section in which a preceding text and a succeeding text overlap, and, regarding the concatenated text, uses a character of the preceding text in a time range earlier than the midpoint, and uses a character of the succeeding text in a time range later than the midpoint.

3. The speech recognition apparatus according to supplementary note 1, wherein
the concatenating unit
detects, regarding a time section in which a preceding text and a succeeding text overlap, a point of time at which a character of the preceding text and a character of the succeeding text do not match,
when a first difference being a difference between the detected point of time and an end point of time of an audio signal corresponding to the preceding text is more than a second difference being a difference between the detected point of time and a start point of time of an audio signal corresponding to the succeeding text, uses, as a character of the concatenated text corresponding to the detected point of time, a character of the preceding text, and,
when the first difference is less than the second difference, uses, as a character of the concatenated text corresponding to the detected point of time, a character of the succeeding text.

4. The speech recognition apparatus according to any one of supplementary notes 1 to 3, wherein
a length of an audio signal corresponding to the each text, or a length of time in which audio signals corresponding to adjacent texts overlap each other is determined based on a speaker or a group of speakers of the source audio signal.

5. The speech recognition apparatus according to any one of supplementary notes 1 to 3, wherein
a length of an audio signal corresponding to the each text, or a length of time in which audio signals corresponding to adjacent texts overlap each other is determined based on a language of the source audio signal.

6. The speech recognition apparatus according to any one of supplementary notes 1 to 3, wherein
a length of an audio signal corresponding to the each text, or a length of time in which audio signals corresponding to adjacent texts overlap each other is determined based on a kind of an utterance represented by the source audio signal.

7. The speech recognition apparatus according to any one of supplementary notes 1 to 3, wherein
a length of an audio signal corresponding to the each text is determined based on an index value representing an estimated speed of an utterance included in the audio signal.

8. A control method executed by a computer, including:
a conversion step of converting a source audio signal including an utterance into a text string; and
a concatenating step of generating a concatenated text representing a content of the utterance by concatenating texts adjacent to each other in the text string, wherein
parts of audio signals corresponding to texts adjacent to each other in the text string overlap each other on a time axis,
the control method further including,
in the concatenating step, at a time of concatenating a preceding text and a succeeding text adjacent to each other in the text string, eliminating, from a preceding text, a part including a trailing portion of the preceding text, and eliminating, from a succeeding text, a part including a leading portion of the succeeding text.

9. The control method according to supplementary note 8, further including:
in the concatenating step,
determining a midpoint of a time section in which a preceding text and a succeeding text overlap; and,
regarding the concatenated text, using a character of the preceding text in a time range earlier than the midpoint, and using a character of the succeeding text in a time range later than the midpoint.

10. The control method according to supplementary note 8, further including:
in the concatenating step,
regarding a time section in which a preceding text and a succeeding text overlap, detecting a point of time at which a character of the preceding text and a character of the succeeding text do not match;
when a first difference being a difference between the detected point of time and an end point of time of an audio signal corresponding to the preceding text is more than a second difference being a difference between the detected point of time and a start point of time of an audio signal corresponding to the succeeding text, using, as a character of the concatenated text corresponding to the detected point of time, a character of the preceding text; and,
when the first difference is less than the second difference, using, as a character of the concatenated text corresponding to the detected point of time, a character of the succeeding text.

11. The speech recognition apparatus according to any one of supplementary notes 8 to 10, wherein
a length of an audio signal corresponding to the each text, or a length of time in which audio signals corresponding to adjacent texts overlap each other is determined based on a speaker or a group of speakers of the source audio signal.

12. The speech recognition apparatus according to any one of supplementary notes 8 to 10, wherein
a length of an audio signal corresponding to the each text, or a length of time in which audio signals corresponding to adjacent texts overlap each other is determined based on a language of the source audio signal.

13. The speech recognition apparatus according to any one of supplementary notes 8 to 10, wherein
a length of an audio signal corresponding to the each text, or a length of time in which audio signals corresponding to adjacent texts overlap each other is determined based on a kind of an utterance represented by the source audio signal.

14. The speech recognition apparatus according to any one of supplementary notes 8 to 10, wherein
a length of an audio signal corresponding to the each text is determined based on an index value representing an estimated speed of an utterance included in the audio signal.

15. A program causing a computer to execute the control method according to any one of supplementary notes 8 to 14.

REFERENCE SIGNS LIST

10 Source data
20 Audio frame sequence
30 Text string
32 Text
40 Concatenated text
1000 Computer
1020 Bus 1040 Processor
1060 Memory
1080 Storage device
1100 Input/output interface
1120 Network interface
2000 Speech recognition apparatus
2020 Conversion unit
2040 Concatenating unit

What is claimed is:

1. A speech recognition apparatus comprising:
at least one memory configured to store instructions; and
at least one processor configured to execute the instructions to perform operations comprising:
converting a source audio signal including an utterance into a text string by generating a time-series data of a plurality of audio frames from the source audio signal and converting each of the plurality of audio frames into a text; and
generating a concatenated text representing a content of the utterance by concatenating texts adjacent to each other in the text string, wherein
wherein parts of audio signals corresponding to texts adjacent to each other in the text string overlap each other on a time axis,
wherein generating the concatenated text comprises, at a time of concatenating a preceding text and a succeeding text adjacent to each other in the text string, eliminating, from a preceding text, a part including a trailing portion of the preceding text, and eliminating, from a succeeding text, a part including a leading portion of the succeeding text, and
wherein generating the concatenated text comprises:
regarding a time section in which a preceding text and a succeeding text overlap, detecting a point of time at which a character of the preceding text and a character of the succeeding text do not match;
when a first difference being a difference between the detected point of time and an end point of time of an audio signal corresponding to the preceding text is more than a second difference being a difference between the detected point of time and a start point of time of an audio signal corresponding to the succeeding text, using, as a character of the concatenated text corresponding to the detected point of time, a character of the preceding text; and
when the first difference is less than the second difference, using, as a character of the concatenated text corresponding to the detected point of time, a character of the succeeding text.

2. The speech recognition apparatus according to claim 1, wherein
a length of an audio signal corresponding to the each text, or a length of time in which audio signals corresponding to adjacent texts overlap each other is determined based on a speaker or a group of speakers of the source audio signal.

3. The speech recognition apparatus according to claim 1, wherein
a length of an audio signal corresponding to the each text, or a length of time in which audio signals corresponding to adjacent texts overlap each other is determined based on a language of the source audio signal.

4. The speech recognition apparatus according to claim 1, wherein
a length of an audio signal corresponding to the each text, or a length of time in which audio signals corresponding to adjacent texts overlap each other is determined based on a kind of an utterance represented by the source audio signal.

5. The speech recognition apparatus according to claim 1, wherein
a length of an audio signal corresponding to the each text is determined based on an index value representing an estimated speed of an utterance included in the audio signal.

6. A control method executed by a computer, comprising:
converting a source audio signal including an utterance into a text string by generating a time-series data of a plurality of audio frames from the source audio signal and converting each of the plurality of audio frames into a text; and
generating a concatenated text representing a content of the utterance by concatenating texts adjacent to each other in the text string, wherein
parts of audio signals corresponding to texts adjacent to each other in the text string overlap each other on a time axis, and
generating the concatenated text comprises, at a time of concatenating a preceding text and a succeeding text adjacent to each other in the text string, eliminating, from a preceding text, a part including a trailing portion of the preceding text, and eliminating, from a succeeding text, a part including a leading portion of the succeeding text,
wherein the generating the concatenated text comprises:
regarding a time section in which a preceding text and a succeeding text overlap, detecting a point of time at which a character of the preceding text and a character of the succeeding text do not match;
when a first difference being a difference between the detected point of time and an end point of time of an audio signal corresponding to the preceding text is more than a second difference being a difference between the detected point of time and a start point of time of an audio signal corresponding to the succeeding text, using, as a character of the concatenated text corresponding to the detected point of time, a character of the preceding text; and
when the first difference is less than the second difference, using, as a character of the concatenated text corresponding to the detected point of time, a character of the succeeding text.

7. The control method according to claim 6, wherein
a length of an audio signal corresponding to the each text, or a length of time in which audio signals corresponding to adjacent texts overlap each other is determined based on a speaker or a group of speakers of the source audio signal.

8. The control method according to claim 6, wherein
a length of an audio signal corresponding to the each text, or a length of time in which audio signals corresponding to adjacent texts overlap each other is determined based on a language of the source audio signal.

9. The control method according to claim 6, wherein
a length of an audio signal corresponding to the each text, or a length of time in which audio signals corresponding to adjacent texts overlap each other is determined based on a kind of an utterance represented by the source audio signal.

10. The control method according to claim 6, wherein
a length of an audio signal corresponding to the each text is determined based on an index value representing an estimated speed of an utterance included in the audio signal.

11. A non-transitory storage medium storing a program causing a computer to execute a control method, the control method comprising:
- converting a source audio signal including an utterance into a text string by generating a time-series data of a plurality of audio frames from the source audio signal and converting each of the plurality of audio frames into a text; and
- generating a concatenated text representing a content of the utterance by concatenating texts adjacent to each other in the text string, wherein
- parts of audio signals corresponding to texts adjacent to each other in the text string overlap each other on a time axis, and
- generating the concatenated text comprises, at a time of concatenating a preceding text and a succeeding text adjacent to each other in the text string, eliminating, from a preceding text, a part including a trailing portion of the preceding text, and eliminating, from a succeeding text, a part including a leading portion of the succeeding text,
- wherein the generating the concatenated text comprises:
  - regarding a time section in which a preceding text and a succeeding text overlap, detecting a point of time at which a character of the preceding text and a character of the succeeding text do not match;
  - when a first difference being a difference between the detected point of time and an end point of time of an audio signal corresponding to the preceding text is more than a second difference being a difference between the detected point of time and a start point of time of an audio signal corresponding to the succeeding text, using, as a character of the concatenated text corresponding to the detected point of time, a character of the preceding text; and
  - when the first difference is less than the second difference, using, as a character of the concatenated text corresponding to the detected point of time, a character of the succeeding text.

* * * * *